US006954922B2

(12) United States Patent
Liang

(10) Patent No.: US 6,954,922 B2
(45) Date of Patent: Oct. 11, 2005

(54) METHOD APPARATUS AND ARTICLE OF MANUFACTURE FOR TIME PROFILING MULTI-THREADED PROGRAMS

(75) Inventor: Sheng Liang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 247 days.

(21) Appl. No.: 09/069,088

(22) Filed: Apr. 29, 1998

(65) Prior Publication Data

US 2002/0099760 A1 Jul. 25, 2002

(51) Int. Cl.⁷ .................................................. G06F 9/44
(52) U.S. Cl. ........................ 717/130; 718/107; 710/18; 710/260
(58) Field of Search ................................ 717/127–131, 717/158, 116; 718/107; 710/18, 19, 260–269; 709/100–108; 712/215; 714/47

(56) References Cited

U.S. PATENT DOCUMENTS

| | | | | |
|---|---|---|---|---|
| 4,070,702 A | * | 1/1978 | Grants et al. ................. | 710/18 |
| 5,297,274 A | * | 3/1994 | Jackson .................. | 395/500.43 |
| 5,694,603 A | * | 12/1997 | Reiffin ......................... | 718/107 |
| 5,768,500 A | * | 6/1998 | Agrawal et al. .............. | 714/47 |
| 5,974,536 A | * | 10/1999 | Richardson .................. | 712/215 |
| 6,002,872 A | * | 12/1999 | Alexander et al. .......... | 702/179 |
| 6,018,759 A | * | 1/2000 | Doing et al. ................. | 709/108 |
| 6,061,710 A | * | 5/2000 | Eickemeyer et al. ........ | 709/107 |
| 6,158,024 A | * | 12/2000 | Mandal ....................... | 702/182 |
| 6,256,775 B1 | * | 7/2001 | Flynn ........................... | 717/127 |
| 6,275,983 B1 | * | 8/2001 | Orton et al. ................. | 717/116 |

OTHER PUBLICATIONS

Rosenberg, "How Debuggers Work: Algorithms, Data Structures, and Architecture", New York, 1996, pp. 95–106.*
Lindholm, Tim, and Yellin, Frank, "The Java Virtual Machine Specification," Addison–Wesley, 1996.

* cited by examiner

Primary Examiner—St. John Courtenay, III
Assistant Examiner—Van H. Nguyen
(74) Attorney, Agent, or Firm—Finnegan, Henderson, Farabow, Garrett & Dunner L.L.P.

(57) ABSTRACT

Methods, systems, and articles of manufacture consistent with the present invention time profile program threads using data corresponding to states of the registers of a processor(s) executing the threads. Methods, systems, and articles of manufacture consistent with the present invention determine whether a selected thread of execution of a multi-threaded program is running by suspending execution of the multi-threaded program, retrieving register data corresponding to the selected thread, computing register information based on the register data, comparing the computed register information with stored register information from a previous suspension of the multi-threaded program, and regarding the selected thread as running if the computed register information is different from stored register information. The last operation of regarding the selected thread as running may involve updating the previous register information based on the computed register information, and/or providing an indication corresponding to a portion of the program containing the selected thread.

30 Claims, 3 Drawing Sheets

METHOD APPARATUS AND ARTICLE OF MANUFACTURE FOR TIME PROFILING MULTI-THREADED PROGRAMS

BACKGROUND OF THE INVENTION

A. Field of the Invention

This invention relates to systems for obtaining information on the execution time of programs and, more particularly, to systems for time profiling multi-threaded applications.

B. Description of the Related Art

Multi-threading is the partitioning of a computer program or application into logically independent "threads" of control that can execute in parallel. Each thread includes a sequence of instructions and data used by the instructions to carry out a particular program task, such as a computation or input/output function. When employing a computer system with multiple processors, each processor executes one or more threads depending upon the number of processors to achieve multi-processing of the program.

A program can be multi-threaded and still not achieve multi-processing if a single processor is used to execute all threads. While a single processor can execute instructions of only one thread at a time, the processor can execute multiple threads in parallel by, for example, executing instructions corresponding to one thread until reaching a selected instruction, suspending execution of that thread, and executing instructions corresponding to another thread, until all threads have completed. In this scheme, as long as the processor has started executing instructions for more than one thread during a given time interval all executing threads are said to be "running" during that time interval.

Time profiling is a technique that determines the distribution of a total execution time among the various parts of a program. Time profiling is often used to isolate program parts for the purpose of improving those parts that require significant execution time. Conventional time profiling techniques, however, have difficulty providing information at the thread level.

These conventional time profiling techniques fall into one of two categories: sampling-based time profiling and code instrumentation. According to the sampling-based approach, a time profiling process, referred to as a "profiler," periodically interrupts program execution and records information concerning currently active functions or call stack traces. The advantage of the sampling approach is that it provides useful information without overly intruding on program execution. The disadvantage is that it is difficult to attribute a time quantum to individual threads from the output. Modern operating systems, for example, do not provide a mechanism for distinguishing the set of threads that are currently active and running (i.e., utilizing the processor) from threads that are alive but inactive. For example, a thread may appear active or running when in reality it is waiting for the completion of an operation, such as being blocked on an I/O operation, and this waiting time should not be counted in the thread's time profile. The situation gets more complex in multi-processor systems. Multiple threads may be running at the same time. There is no way under the sampling-based approach, however, for a user-level profiler to identify the set of threads running at a given time interval on the multiple processors.

A profiler using the code instrumentation approach requires the insertion of special code into the program itself, either at compile time or runtime. Code instrumentation allows a profiler to collect detailed information about program execution. However, the cost of modifying the program is high. Most importantly, code instrumentation profiling requires special support from the operating system to provide an accurate per-thread time quantum. Neither the current versions of Solaris™ from Sun™ Microsystems™, Inc. or Windows NT/95 from Microsoft, Inc. provide such support.[1]

[1] Sun, Sun Microsystems, the Sun Logo, Java, the Java Virtual Machine, and Solaris are trademarks or registered trademarks of Sun Microsystems, Inc. in the United States and other countries.

Accordingly, there is a need for a system that time profiles multi-threaded applications in a versatile way to overcome the deficiencies of existing time profiling techniques.

SUMMARY OF THE INVENTION

Methods, systems, and articles of manufacture consistent with the present invention overcome the shortcomings of existing time profiling techniques by time profiling program threads using information corresponding to the contents of the registers of a processor(s) executing the threads. Methods, systems, and articles of manufacture consistent with the present invention, as embodied and broadly described herein, time profile multiple threads of execution corresponding to a program by interrupting execution of all of the threads, determining whether register data corresponding to a selected thread has changed, and providing an indication of the change for the selected thread. One way to determine whether register data corresponding to a selected thread has changed involves accessing stored data corresponding to the selected thread, and comparing the stored data with register information stored following a previous interrupt. This comparison may involve specifying register information corresponding to the stored data, and determining a relationship between the specified register information and the previously stored register information. To provide an indication of the change for the selected thread, a profile is updated to reflect that the selected thread is running when it is determined that the specified register information and the previously stored register information do not match.

In accordance with another aspect of the present invention, methods, systems, and articles of manufacture, as embodied and broadly described herein, determine whether a selected thread of execution of a multi-threaded program is running by suspending execution of the multi-threaded program, retrieving register data corresponding to the selected thread, computing register information based on the register data, comparing the computed register information with stored register information from a previous suspension of the multi-threaded program, and regarding the selected thread as running if the computed register information is different from stored register information. The last operation of regarding the selected thread as running may involve updating the previous register information based on the computed register information, and/or providing an indication corresponding to a portion of the program containing the selected thread.

In accordance with yet another aspect of the present invention, methods, systems, and articles of manufacture, as embodied and broadly described herein, time profile multiple threads of execution corresponding to a program by suspending execution of the program, determining whether stored information corresponding to processor registers for each thread indicates that the thread is running, and recording time-profiling information for each running thread.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
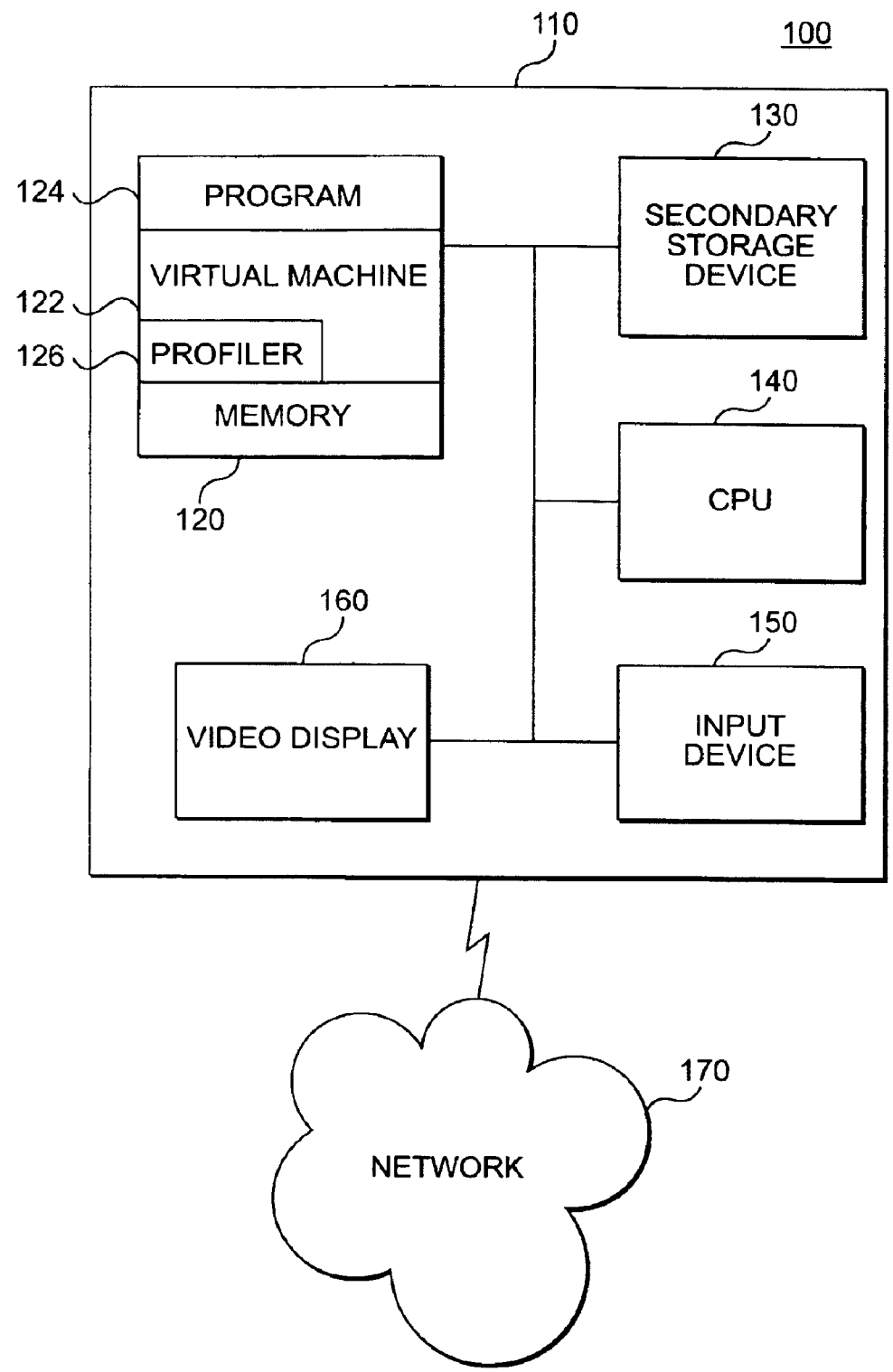
FIG. 1 is a block diagram of an exemplary data processing system with which the invention may be implemented.

Reference will now be made in detail to an implementation consistent with the present invention as illustrated in the accompanying drawings. Wherever possible, the same reference numbers will be used throughout the drawings and the following description to refer to the same or like parts.

Introduction

Methods and systems consistent with the present invention time profile threads of a program by periodically interrupting execution of the program and determining whether stored information associated with the contents of processor registers for each thread indicates that the thread has been running. If it is determined that a thread is running, for example, when the stored register information for the thread is not the same as register information from a previous interrupt, i.e., time profiling cycle, then a cost indicator for the thread is modified to reflect the fact that the thread is running. This indication can be accomplished, for example, by incrementing a corresponding counter by a factor associated with the time profiling cycle to provide a time quantum for each thread. Otherwise it is assumed that the thread has not executed an instruction since the previous interrupt and the indicator for that thread is not updated.

The output of the time profiler includes a processor time profile. A per-thread counter is the simplest form of processor time profile. In practice, however, the profiler can record additional useful information. A time profile may assign a cost indicator to the specific part of the program that happens to be active when a thread is determined to be running. For example, this may be the names of the functions being executed by the running thread.

The profiler relies on whether the register information has changed to determine whether the thread is running or not. The register information may be, for example, a copy of the data stored in the registers of a processor or central processing unit (CPU) or, to save storage space, methods and systems consistent with the present invention may utilize a value, such as a checksum, which is computed from that register information. In other words, a known checksum algorithm may be applied to the processor register information to enable systems consistent with the present invention to store a small amount of information indicating the contents of the registers without storing their full contents. A 32-bit processor may have thirty-two 32-bit registers, which translates into a significant amount of storage capacity for time profiling with the full contents of the registers. Using a computed value, as opposed to the full contents of the registers, also reduces the intrusiveness of time profiling, although users are unlikely to see a significant difference in total program execution time when using faster processors. Moreover, not all registers may be used for all threads. As those skilled in the art will recognize, utilizing a checksum or other computed value in place of the actual contents of the registers allows for a small error, which is generally tolerable in profiling where, for example, a ninety-nine percent accurate result is informative enough for programmers.

Computer Architecture

FIG. 1 depicts an exemplary data processing system 100 suitable for practicing methods and implementing systems consistent with the present invention. Data processing system 100 includes a computer system 110 connected to a network 170, such as a Local Area Network, Wide Area Network, or the Internet.

Computer system 110 contains a main memory 120, a secondary storage device 130, a central processing unit (CPU) 140, an input device 150, and a video display 160. Main memory 120 contains a virtual machine (VM) 122 and program 124. An exemplary VM for purposes of this description is the Java™ Virtual Machine (JVM), which is part of the Java™ runtime environment included in the Java™ software development kit (JDK) available from Sun Microsystems of Mountain View, Calif. In general, the JVM acts like an abstract computing machine, receiving instructions from programs in the form of bytecodes and interpreting these byte codes by dynamically converting them into a form for execution, such as object code, and executing them. This execution scheme for programs, such as programs written in the Java™ programming language, facilitates the platform independent nature of the JVM. Further details on the JVM can be found in a number of texts, including Lindholm and Yellin, *The Java Virtual Machine Specification*, Addison-Wesley, 1997, which is hereby incorporated by reference.

A profiler 126 implements a time profiling process consistent with the present invention. Although profiler 126 is shown as part of VM 122, other implementations consistent with the present invention do not require a VM for time profiling programs. In such cases, profiler 126 may be a facility of an operating system or even an independent tool. Additionally, one skilled in the art will appreciate that although one implementation consistent with the present invention is described as being practiced in a JVM, systems and methods consistent with the present invention may also be practiced in an environment other than a Java™ environment. Also, although aspects of one implementation are depicted as being stored in memory 120, one skilled in the art will appreciate that all or part of systems and methods consistent with the present invention may be stored on or read from other computer-readable media, such as secondary storage devices, like hard disks, floppy disks, and CD-ROM; a carrier wave received from the Internet; or other forms of ROM or RAM. Finally, although specific components of data processing system 100 have been described, one skilled in the art will appreciate that a data processing system suitable for use with the exemplary embodiment may contain additional or different components.

Multi-threaded Time Profiling System

Figure 2:
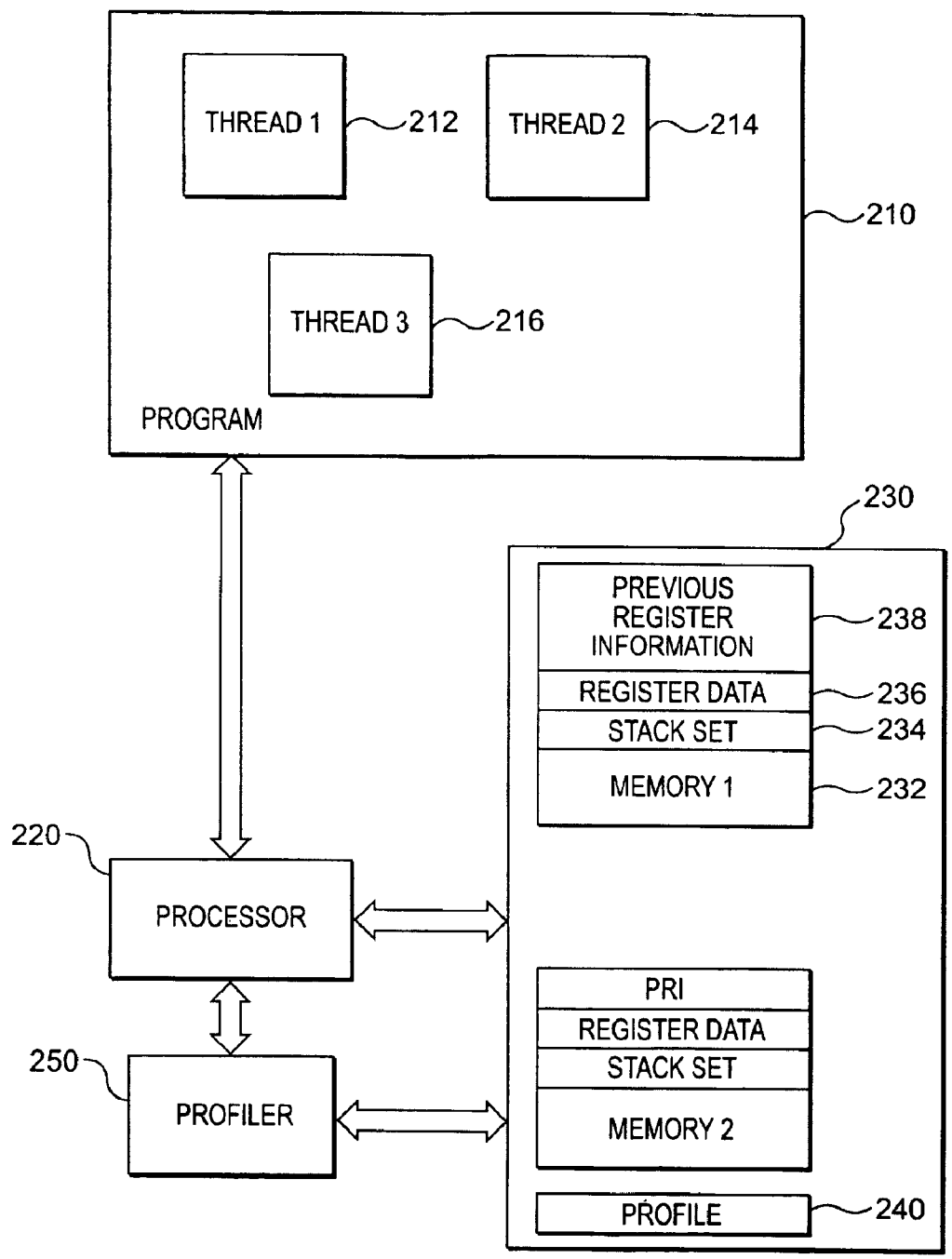
FIG. 2 is a block diagram of a multi-threaded time profiling system consistent with the present invention.

FIG. 2 is a block diagram of a multi-threaded time profiling system consistent with the present invention. As shown, program 210 consists of multiple threads 212, 214, and 216. Utilizing a VM, such as the JVM, or a facility of an operating system, such as Windows NT/95, processor 220 executes threads 212, 214, and 216 in parallel.

To facilitate parallel execution of multiple threads, VMs and operating systems partition memory 230 into segments designated for operations associated with each thread and initializes the fields of each segment. For example, thread 212 has a corresponding memory segment 232.

Memory segment 232, for example, is comprised of a stack set 234, register data 236, and previous register information 238. Stack set 234 is used to store data associated with execution of thread 212. Register data 236 stores a copy of the contents of the registers of processor 220 at a current time interrupt. Previous register information 238 stores, for example, a copy of the contents of the registers of processor 220 or a computed value corresponding to the contents of the registers of processor 220 recorded from a previous time interrupt.

In general, profiler 250 time profiles each running thread by determining whether there are any differences between register data for each thread at a time interrupt and register data from a previous interrupt. When profiler 250 suspends execution of a thread, the operating system or VM stores in register data 236 a copy of the contents of registers from processor 220 associated with the thread. Depending on whether profiler 250 stores a computed value corresponding to the contents of the registers of processor 220 recorded from a previous time interrupt in previous register information 238, profiler 250 either compares register data 236 with previous register information 238 or first computes a value corresponding to the register data 236 and compares the computed value with previous register information 238. If there are changes from the register information of the previous interrupt, the thread is running.

In addition to the memory segments, memory 230 includes a profile segment 240 for recording information about running threads, such as the identification of each part of the program in which the thread is executing. This enables the programmer to identify a part of the program incurring a cost based on the results of the profiling process.

For example, profile segment 240 may include a table consisting of a cost indicator, thread identification, and method name as follows:

| Cost Indicator | Thread | Method Name |
| --- | --- | --- |
| 141 | 1 | String.compare |
| 32 | 2 | String.equals |
| 15 | 1 | String.equals |
| 9 | 1 | Object.toString |

In this example, the program has two threads of control (labeled 1 and 2 in the table) and consists of at least three methods: String.compare, String.equals, and Object.toString. The cost indicator indicates how many times profiler 250 found the thread to be running in a particular method. In this example, the cost indicator is not only assigned to each thread, but also to the method associated with the thread. From this example table, a programmer knows that thread 1 spends a lot of time (i.e., 141 time profiling cycles) in the String.compare method of the program. The programmer can thus optimize the program to reduce the use of the String.compare method or modify that method to operate more efficiently in view of its frequent use.

Time Profiling Process

Figure 3:
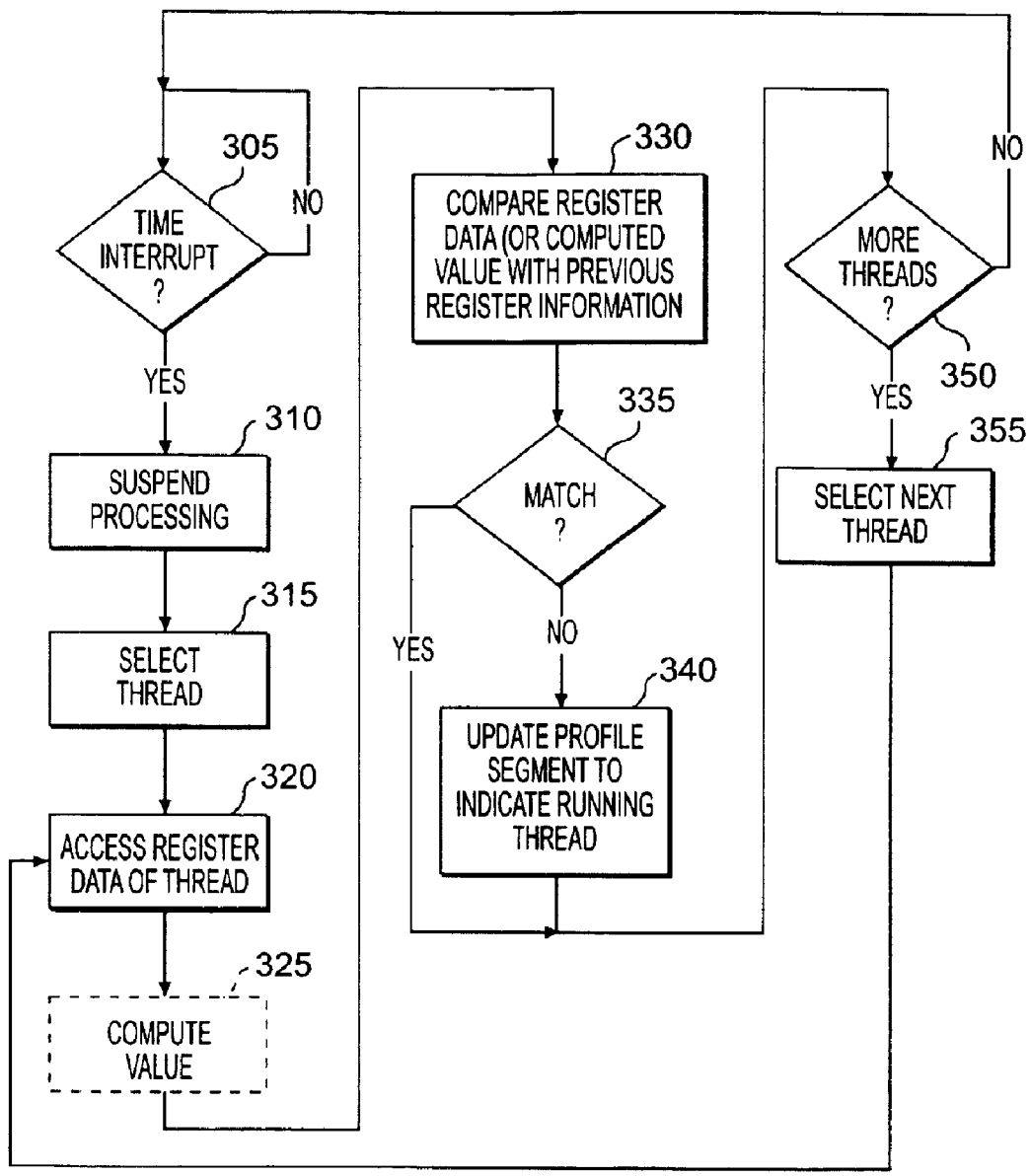
FIG. 3 is a flow chart illustrating acts performed by the time profiling system consistent with an implementation of the present invention.

Further details on operation of profiler 250 will now be explained with reference to the flow chart of FIG. 3. Once initiated as part of, for example, the start-up process of an operating system or VM or the execution of a multi-threaded program, profiler 250 enters a state shown as step 305 in which it waits for a time interrupt. A time interval for the interrupt of profiler 250 may be selected by the user or predetermined by the operating system or VM.

Upon the occurrence of a time interrupt (step 305), profiler 250 suspends execution of all threads (step 310). Profiler 250 then iterates through all threads by examining corresponding memory segments, particularly, register data 236 and previous register information 238, to determine whether a thread is running and update profile segment 240 accordingly (steps 315 to 355).

In one iteration, profiler 250 selects one of the threads (step 315) and accesses register data 236 for the selected thread (step 320). As an option, profiler 250 may then compute a value, such as a checksum, corresponding to register data 236 for the selected thread (step 325). Because this computation is an optional step, it is shown in FIG. 3 by a box with a line pattern different from the boxes for the remaining steps.

Profiler 250 then compares either register data 236 with previous register information 238 in implementations that do not utilize the optional step 325, or the computed value corresponding to the register data 236 with previous register information 238 in implementations that utilize the optional step 325 (step 330). For the first iteration, previous register information 238 includes a null value(s) initialized by the operating system or VM.

If they do not match (step 335), profiler 250 concludes that the selected thread is running. In this case, profiler 250 updates the previous register information 238 for the running thread with register data 236 or the computed value corresponding to register data 236, depending on whether optional step 325 is utilized, and updates profile segment 240 with relevant profiling information about the running thread, such as the most-recently called function, and stores the profiling information and a cost indicator in profile segment 240 (step 340). When the program finishes execution, profile segment 240 may be provided to the programmer for review.

Otherwise, profiler 250 determines that the selected thread is not running and skips step 340.

In either case, profiler 250 determines whether there are any more program threads for time profiling (step 350) and, if so, it selects the next thread (step 355) and continues operation in step 320. Otherwise, it returns to the wait state for the next interrupt (step 305).

Conclusion

Methods and systems consistent with the present invention time profile threads of a program by periodically interrupting execution of the program and determining whether stored information corresponding to processor registers for each thread indicates that the thread has been running. One of the advantages to time profiling in this manner is that it does not require any special support from the operating system. All that is required is a way to suspend the threads and obtain their register sets. This support is available in current versions of Windows NT/95, Solaris, and many other operating systems. Methods consistent with the present invention also work well with multi-processor machines. On a multi-processor machine, a number of threads may show up as having updated register sets at the time profiling interrupt point.

The difference in register set information generally provides a good indication of whether any computation has taken place in the thread. Although there are instances in which program instructions that cause a thread to maintain a constant register set, for example, infinite loops, although realistic programs should not have this problem.

Finally, systems consistent with the present invention are applicable to all multi-threaded programs written in all computer programming languages, including Java, C, and C++.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

What is claimed is:

1. A method for time profiling multiple threads of execution corresponding to a program, comprising:

periodically interrupting execution of all of the threads;

determining whether register data corresponding to a selected thread has changed from a previous interrupt of all of the threads; and providing an indication of the change for the selected thread.

2. The method of claim 1, wherein the determining step includes accessing stored data corresponding to the selected thread; and comparing the stored data with register information stored following a previous interrupt.

3. The method of claim 2, wherein the comparing step includes computing a value corresponding to the stored; and determining a relationship between the computed value and the previously stored register information.

4. The method of claim 3, wherein the step of providing an indication of the change for the selected thread includes updating a memory segment to reflect that the selected thread is running when it is determined that the computed value and the previously stored register information do not match.

5. The method of claim 1, further comprising:

assigning a cost indicator to an identified portion of the program that is active when it is determined that the selected thread is running.

6. The method of claim 5, wherein the cost indicator reflects a number of cycles the selected thread was running in the identified portion of the program.

7. A method for determining whether a selected thread of execution of a multi-threaded program is running, comprising:

suspending execution of the multi-threaded program;

retrieving register data corresponding to the selected thread;

computing a value based on the register data;

comparing the computed value with register information stored following a previous suspension of the multi-threaded program;

regarding the selected thread as running if the computed value is different from the previously stored register information; and providing an indication corresponding to a portion of the program containing the selected thread.

8. The method of claim 7, wherein the regarding step includes updating the previous register information based on the computed value.

9. The method of claim 7, wherein the indication reflects a number of cycles the selected thread was running in a portion of the program that is active when it is determined the selected thread is running.

10. A method for time profiling multiple threads of execution corresponding to a program, comprising:

periodically suspending execution of the program;

determining whether information corresponding to processor registers for each thread indicates that the thread is running by comparing the information to stored information from a previous interrupt of all of the threads; and recording time-profiling information for each running thread.

11. The method of claim 10, wherein the time-profiling information includes a cost indicator that reflects a number of cycles the selected thread was running in the portion of the program that is active when it is determined the selected thread is running.

12. A time profiling system, comprising:

a multi-threaded program; and a processor configured to execute the multi-threaded program, and to periodically interrupt execution of all of the threads to determine whether register data corresponding to a selected thread has changed from a previous interrupt and provide an indication of the change for the selected thread.

13. The system of claim 12, wherein the processor is further configured to access stored data corresponding to the selected thread and compare the stored data b with register information stored following a previous interrupt.

14. The system of claim 13, wherein the processor is further configured to compute a value corresponding to the stored data and determine a relationship between the computed value and the previously stored register information.

15. The system of claim 14, wherein the processor is further configured to update a memory segment to reflect that the selected thread is running when it is determined that the computed value and the previously stored register information do not match.

16. A time profiling system, comprising:

a multi-threaded program; and a processor configured to periodically suspend execution of the multi-threaded program, to retrieve register data corresponding to a selected thread, compute a value based on the register data, compare the computed value with register information stored following a previous suspension of the multi-threaded program, regard the selected thread as running if the computed value is different from the previously stored register information, and provide an indication corresponding to a portion of the program containing the selected thread.

17. The system of claim 16, wherein the processor is further configured to updating the previous register information based on the computed value.

18. A time profiling system for time profiling multiple threads of execution corresponding to a program, comprising:

a processor configured to periodically suspend execution of the program; and said processor further configured to, during each program suspension, determine whether information corresponding to processor registers for each program thread indicates that the thread is running by comparing the information to stored information from a previous program suspension and record time-profiling information for each running thread.

19. An article of manufacture containing instructions for performing operations, when executed by a processor, for time profiling multiple threads of execution corresponding to a program, by:

periodically interrupting execution of all of the threads;

determining whether register data corresponding to a selected thread has changed from a previous interrupt of all of the threads; and providing an indication of the change for the selected thread.

20. The article manufacture of claim 19, wherein the determining step includes accessing stored data corresponding to the selected thread; and comparing the stored data with register information stored following a previous interrupt.

21. The article of manufacture of claim 20, wherein the comparing step includes computing a value corresponding to the stored data; and determining a relationship between the computed value and the previously stored register information.

22. The article of manufacture of claim 21, wherein the step of providing an indication of the change for the selected thread includes updating a profile to reflect that the selected thread is running when it is determined that the computed value and the previously stored register information do not match.

23. The article of manufacture of claim 19, wherein the method further comprises: assigning a cost indicator to an identified portion of the program that is active when it is determined that the selected thread is running.

24. The article of manufacture of claim 23, wherein the cost indicator reflects a number of cycles the selected thread was running in the identified portion of the program.

25. An article of manufacture containing instructions for performing operations, when executed by a processor, for determining whether a selected thread of execution of a multi-threaded program is running, by:

suspending execution of the multi-threaded program;

retrieving register data corresponding to the selected thread;

computing a value based on the register data;

comparing the computed value with register information stored following a previous suspension of the multi-threaded program;

regarding the selected thread as running if the computed value is different from the previously stored register information; and providing an indication corresponding to a portion of the program containing the selected thread.

26. The article of manufacture of claim 25, wherein the regarding step includes updating the previous register information based on the computed value.

27. The article of manufacture of claim 25, wherein the indication reflects a number of cycles the selected thread was running in a portion of the program that is active when it is determined the selected thread is running.

28. An article of manufacture containing instructions for performing operations, when executed by a processor, for time profiling multiple threads of execution corresponding to a program, by:

periodically suspending execution of the program;

determining whether information corresponding to processor registers for each thread indicates that the thread is running by comparing the information to stored information from a previous interrupt; and recording time-profiling information for each running thread.

29. The article of manufacture of claim 28, wherein the time profiling information includes a cost indicator that reflects a number of cycles the selected thread was running in the portion of the program that is active when it is determined the selected thread is running.

30. A system for time profiling multiple threads of execution corresponding to a program, comprising:

means for periodically interrupting execution of all of the threads;

means for determining whether register data corresponding to a selected thread has changed from a previous interrupt; and means for providing an indication of the change for the selected thread.

* * * * *

UNITED STATES PATENT AND TRADEMARK OFFICE
CERTIFICATE OF CORRECTION

PATENT NO.   : 6,954,922 B2
DATED        : October 11, 2005
INVENTOR(S)  : Sheng Liang It is certified that error appears in the above-identified patent and that said Letters Patent is hereby corrected as shown below:

Title page,
Item [54], Title, "METHOD APPARATUS AND ARTICLE" should read
-- METHOD, APPARATUS, AND ARTICLE --.

Column 7,
Line 28, "stored; and" should read -- stored data; and --.

Column 8,
Line 27, "data b with" should read -- data with --.
Line 52, "updating" should read -- update --.
Line 60, "whether information" should read -- whether stored information --.

Column 9,
Line 9, "article manufacture" should read -- article of manufacture --.

Signed and Sealed this

Fourteenth Day of March, 2006

JON W. DUDAS
*Director of the United States Patent and Trademark Office*